Figure 1:
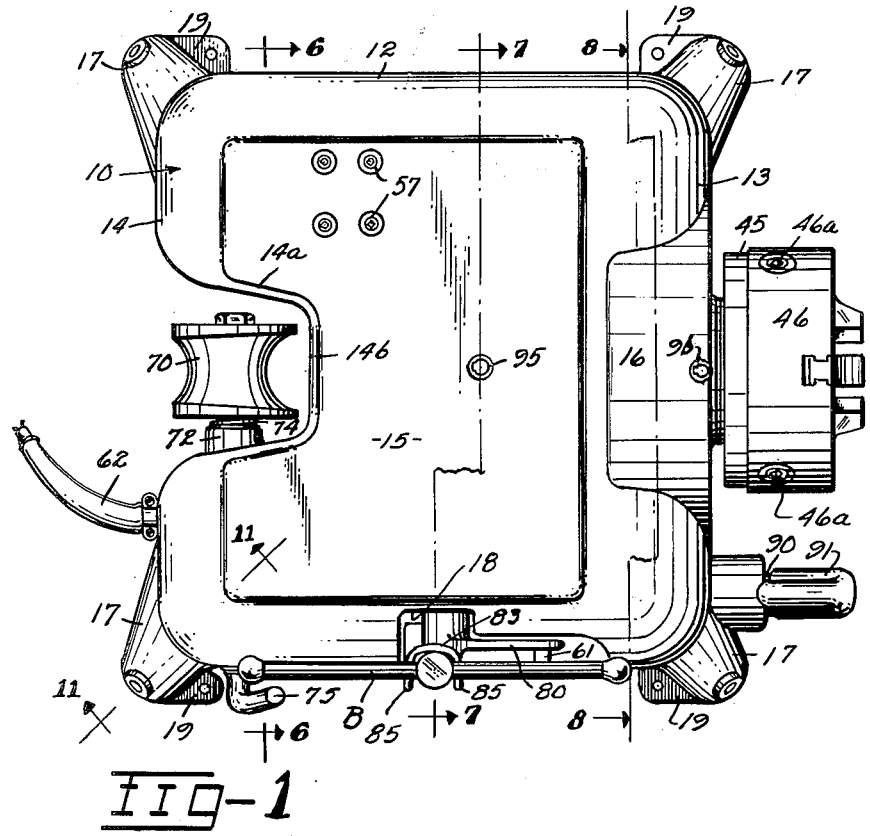

Jan. 13, 1953    R. B. PEALER    2,624,895
POWER DRIVE
Filed June 17, 1949    4 Sheets-Sheet 1

INVENTOR.
ROBERT B. PEALER
BY
Bates, Teare, v McLean
ATTORNEYS

Jan. 13, 1953  R. B. PEALER  2,624,895
POWER DRIVE
Filed June 17, 1949  4 Sheets-Sheet 3
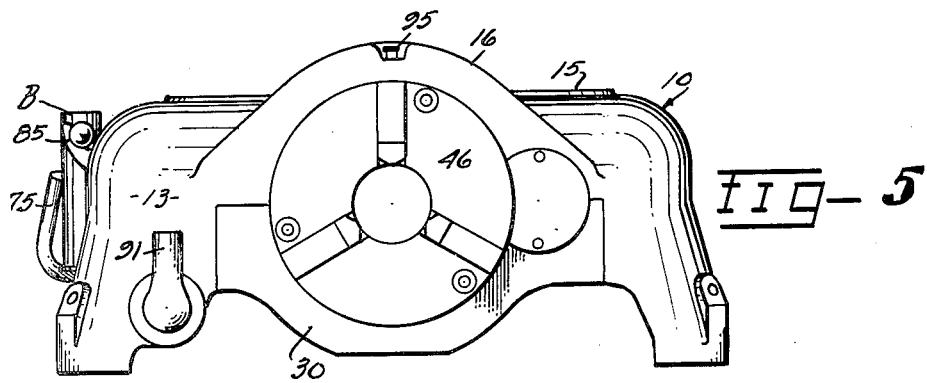
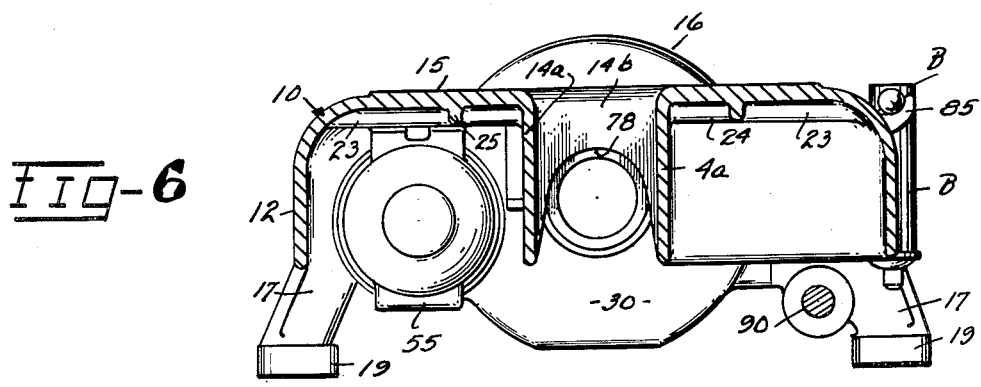
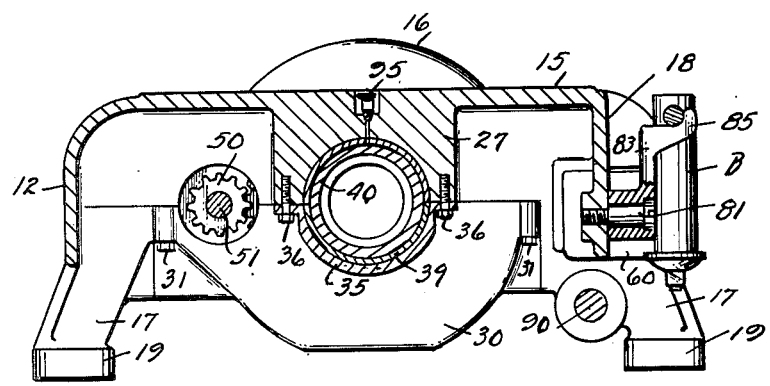
INVENTOR.
ROBERT B. PEALER
BY Bates, Teare, & McBean
ATTORNEYS

INVENTOR.
ROBERT B. PEALER
BY
ATTORNEYS

Patented Jan. 13, 1953

2,624,895

UNITED STATES PATENT OFFICE 2,624,895

POWER DRIVE

Robert B. Pealer, Garrettsville, Ohio, assignor to Beaver Pipe Tools, Inc., Warren, Ohio, a corporation of Ohio Application June 17, 1949, Serial No. 99,775

2 Claims. (Cl. 10—107)

This invention relates to a power unit comprising a driving motor, a driven chuck, and intermediate reduction gearing all mounted in a readily portable frame, such a device being commonly known as a "power drive." One of the objects of the invention is to provide such power drive in an efficient and at the same time extremely compact form. Lightness of construction, low center of gravity, and ease of assemblage of the device are also features of my invention.

More particularly, my invention provides a one-part frame, with suitable under caps, to provide aligned bearing recesses for a rotatable barrel which carries a chuck at its projecting end and within the frame carries a gear with which a driving motor mounted within the frame is connected. The frame is recessed at the end opposite the chuck to enable the mounting of an adjustable pipe rest within the confines of the frame. The machine is also provided with an electric switch controlling the motor, which switch has its operating lever at the front side of the frame and is associated with a chuck wrench holder which operates to lock the switch when the chuck wrench is absent, thereby preventing the inadvertent starting of the motor when the chuck wrench is in a wrench socket in the chuck. Other features of the invention will be apparent from the following detailed description of a preferred embodiment shown in the drawings.

Figure 2:
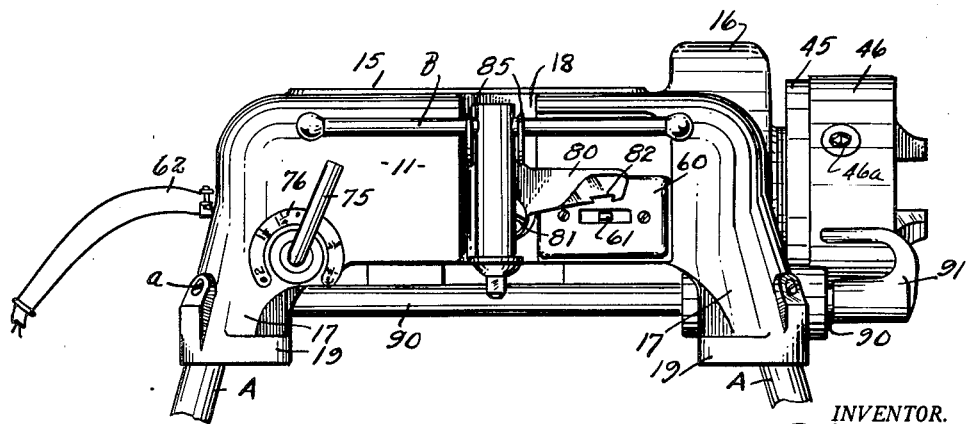
Figure 3:
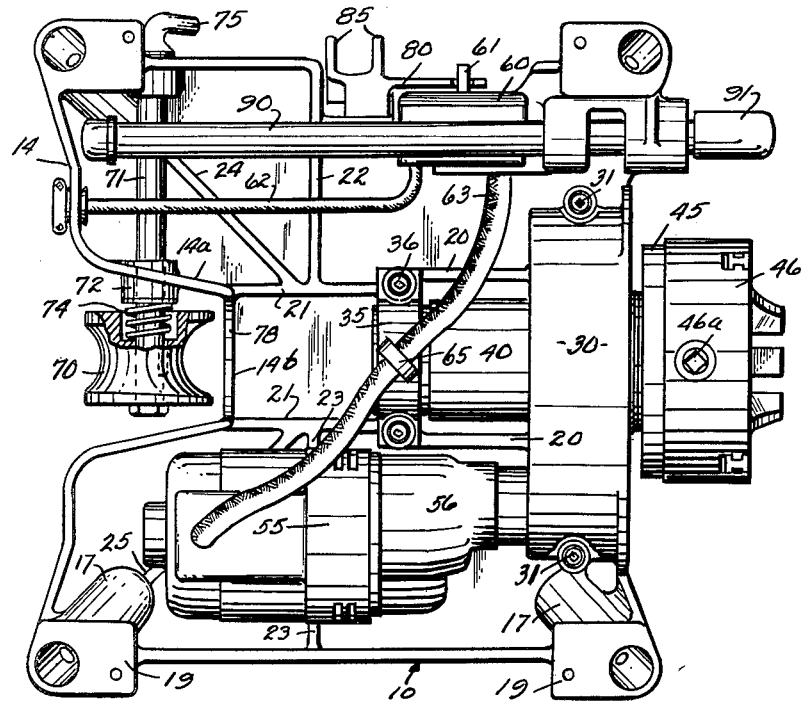
Figure 4:
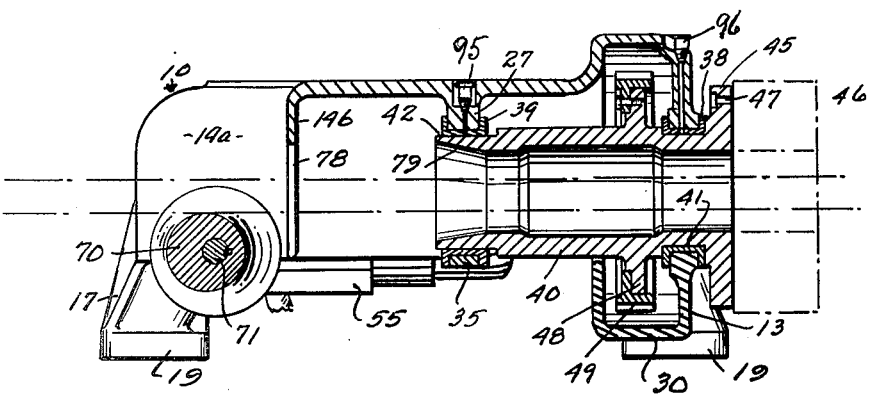
Figure 8:
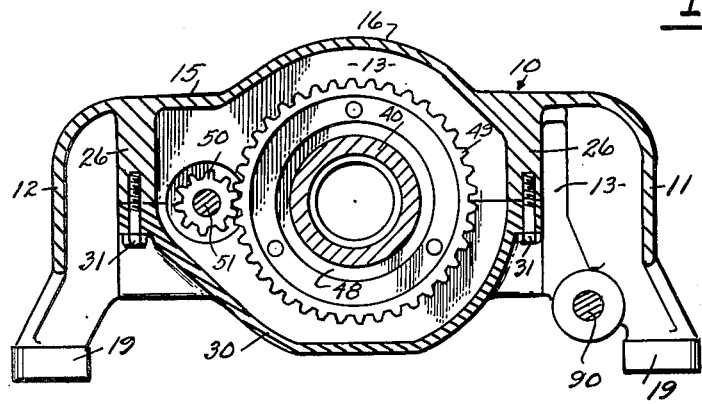
Figure 9:
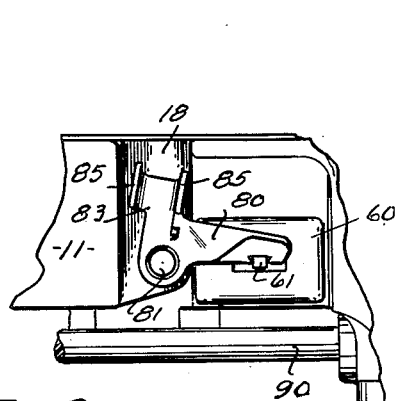
Figure 10:
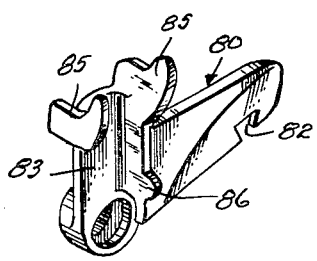
Figure 11:
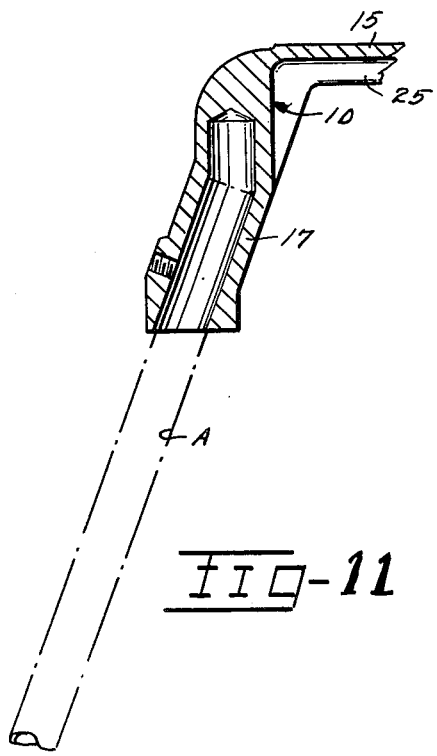

In the drawings, Fig. 1 is a plan view of my improved power drive; Fig. 2 is a front side elevation; Fig. 3 is a bottom plan view of the power drive illustrating the motor, chuck-spindle and switch in position therein; Fig. 4 is a vertical section through the axis of the chuck spindle; Fig. 5 is an end elevation looking at the right hand end of the machine; Figs. 6, 7 and 8 are vertical sections from front to back and looking toward the right, as indicated by the correspondingly numbered lines on Fig. 1; Fig. 9 is a fragmentary front elevation showing the switch lock in its active position; Fig. 10 is a perspective of the switch lock lever; Fig. 11 is a section in an upright plane inclined to the vertical at any of the four corners indicated by the line 11—11 on Fig. 1.

The frame of my power drive comprises principally a single hollow member 10 of the form shown in Figs. 1 to 8, which may readily be a single integral casting with comparatively thin walls and internal webs. The member 10 has a front wall 11, rear wall 12, a right end wall 13 and an offset left end wall 14, 14a, 14b, all these walls being substantially vertical and merging by gradual curves into a flat top portion 15. Near the left hand end the top is bulged upwardly at 16.

At each corner the front and rear walls of the frame are curved into the adjacent end walls, and at the corner the frame member is formed into downwardly and outwardly extending tubular legs 17 which are provided at their lower ends with flat feet 19. The feet 19 are provided with bolt openings whereby they may be readily secured to a bench.

The tubular sockets 17 provide means for the insertion of diagonal supporting pipes A which may be employed if it is desired to support the device at a reasonable elevation. When such pipes are employed they may be readily secured by set screws $a$ passing from the exterior into abutting engagement with the pipes.

The main frame above described is braced on the underside by various comparatively thin vertical stiffening webs. For instance, I have shown a pair of longitudinal webs 20, another pair 21, each on opposite sides of the chuck axis; transverse webs 22 and 23 leading outwardly from the webs 22 to the front and rear sides of the frame, and diagonal webs 24 and 25 leading from the webs 21 to the left hand corners of the device. Other webs may be employed if desired.

The front end wall 13 is formed with a downwardly facing semi-cylindrical recess in its undersurface, and beyond this the frame has downwardly extending bosses 26. Similarly a frame portion at 27 extends downwardly from the top at the junction of the webs 20 and 21 and transversely thereof and has a semicylindrical recess on its undersurface. Suitable caps having semicylindrical recesses on their upper faces are joined to the parts just mentioned of the frame to form complete cylindrical bearings for the chuck barrel.

As shown, I mount a cap 30, which is a sort of boat-shaped member extending transversely, against the underside of the frame portions 26 to which the cap is secured by upwardly extending bolts 31, and I mount a semi-cylindrical strap 35 under the frame portion 27 and secure it by upwardly extending bolts 36. The simple application of this cap and strap to the downwardly facing semi-cylindrical recesses of the frame provide two aligned cylindrical bearing members for the chuck barrel. Each of these bearing members is lined by a semi-circular channel-shaped liner 38 and 39. These liners by reason of their flanges are automatically held in place when the cap 30 and strap 35 are attached and such liners provide smooth cylindrical bearings for the chuck barrel.

The chuck barrel 40 is a substantially cylindrical member having an annular recess 41 near its forward end journaled in the liners 38, and having near its rear end a smooth cylindrical portion 42 journaled in the liners 39. In front of the recess 41 the chuck barrel is flanged outwardly to form a head 45. This head is bolted to the chuck 46 by bolts 47.

The chuck barrel between its bearing portions has an outward flange 48 to which is bolted a spur gear 49. This gear extends downwardly into the oil receptacle provided by the cap 30. Meshing with the gear is a pinion 50 on a shaft 51 driven by a motor 55 through suitable reduction gearing not shown but contained in a casing 56 mounted on the motor frame. This motor is supported by the top plate portion 15 of the frame 10. Suitable bolts 57, the heads of which occupy depressions in the top plate, are screwed from the top downwardly into the frame of the motor and thus suspend it from the top of the frame.

I provide a suitable controlling switch 60 in a box mounted in the frame, the switch having a forwardly projecting operative lever 61. A lead-in conductor 62 passes from one end of the frame to the switch and armored electric conductors 63 pass from the switch to the motor. I find it convenient to support the cable 63 intermediately by an eye 65 screwed into the strap 35.

It will be seen that the mounting of the chuck barrel and motor in the frame and the attaching of the switch and its connections is a very simple matter. Preferably the bolts attaching the motor are inserted with the frame standing on edge and then the frame is placed bottom side up on the bench and the chuck barrel put in place and the caps and straps supplied to the underside of the frame to hold the chuck barrel. Then the switch is put in place and the cables attached.

I have referred to the end wall of the frame being offset inwardly as shown at 14a and 14b. This offset provides an outwardly open pocket beyond the innermost portion of the rear wall and between the longitudinally extending portions of such wall. The adjustable pipe rest is located in this pocket.

The pipe rest comprises an eccentric spool 70 rigidly mounted on a horizontal shaft 71 occupying a bearing 72 in the adjacent longitudinal portion of the rear base wall and another bearing in the front portion and beyond the latter bearing being provided with a handle 75. A suitable arcuate gauge 76 on the front 11 cooperates with the hand lever 75 to furnish a convenient indication of the setting of the pipe rest for any size of pipe desired.

A helical compression spring 74 (Fig. 3), surrounding the shaft 71 and seating in a recess in the spool and pressing at one end against the bearing 72 and at the other end against the spool, causes sufficient friction to prevent inadvertent displacement of the spool. The eccentric formation of the spool, as indicated in Figs. 1, 3 and 4 enables its uppermost surface to support a pipe of any size, within the range of the machine, in axial alignment with the chuck, as indicated in broken lines by the pipe in Fig. 4.

The end wall 14b, of the frame has an opening 78 of considerable size through it for the easy insertion of the pipe. The ease of insertion into the chuck barrel is aided by a conical entrance portion 79 and an enlarged interior portion in the chuck barrel. Accordingly, in inserting the pipe it is not necessary for it to strictly align with the axis of the chuck, as it may be readily shoved along the chuck barrel while somewhat askew, and is finally centered as the pipe reaches the chuck.

I provide a lock for the switch lever in the form of a bell crank 80 (Figs. 1, 2, 9 and 10) pivoted at 81 to the front 11 of the frame and having a substantially horizontal arm with a notch 82 in its lower edge adapted to extend on the opposite sides of the switch lever 61 to lock it. The other arm 83 of the bell crank extends upwardly and is provided with a pair of forwardly extending jaws 85 which form a rest for the chuck wrench B, Figs. 1, 2, 6 and 7. When the wrench is in the position shown in these figures, with its handle resting on the jaws and its body depending between the jaws, such body comes slightly beyond the pivotal axis of the bell crank so that the weight of the chuck wrench operates to swing the bell crank, raising the horizontal arm into position to free the switch lever, as shown in Fig. 2. In this condition the operator may actuate the switch to connect the motor and drive the chuck in either direction desired.

The chuck is provided with the usual controlling socket 46a adapted to be actuated by the projecting square end of the chuck wrench. As soon as the operator removes the chuck wrench from its support, to place its end in the socket 46a, such action releases the bell crank, and it swings by gravity into the position shown in Fig. 9 automatically locking the switch. It is then impossible to start the motor while the attendant is in the act of operating the chuck jaws, or if he should inadvertently leave the chuck wrench standing in the chuck socket. This safety provision prevents possible injury to the operator or damage to the machine.

The switch lock 80, as will be seen from Figs. 1, 2 and 9, is mounted within a recess 18 in the front of the frame. The walls of this recess provide limits for the swing of this locking lever. The upwardly extending arm 83 of the locking lever is provided with lip 86 adjacent the horizontally extending arm to insure the chuck wrench when placed in the jaws 85 lying with its up-and-down axis beyond the pivotal axis of the switch lock.

It is convenient to provide the power drive with means to hold the handle of a hand die stock which may be used for threading the pipe mounted in the chuck. I have shown for this purpose a rod 90 slidably mounted in the lower portion of the frame 10 and carrying a hook 91 at its forward end. When the rod is drawn forwardly from the position shown the hook 90 with its projecting tine and sleeve portion constitutes a fork embracing the die stock handle, preventing movement thereof in either direction.

Suitable oil cups 95 and 96, mounted in depressions in the top of the frame, may be provided for oiling the bearings of chuck barrel.

It will be seen that I have provided, in a very compact and readily portable form, a power drive comprising a hollow frame enclosing a motor and a rotary barrel carrying an external chuck and geared to reduction gearing mounted in the motor casing. The pipe rest is within the confines of the frame. The switch for controlling the motor is conveniently located and is itself controlled by a convenient support for the chuck wrench. The machine may be conveniently secured to a bench or if desired may be supported from the ground by the four extension legs. It has a flat top,

I claim:

1. In a power drive, the combination of a frame, comprising a single integral casting having a top, front, rear and end walls and four downwardly extending corner sockets, said frame having a downwardly facing semi-cylindrical bearing, a member housed between said front and rear walls and having an upwardly facing semi-cylindrical bearing secured to portions of the frame depending from said top to provide a complete cylindrical bearing, a chuck barrel mounted in said cylindrical bearing, and a chuck on said barrel.

2. In a power drive, the combination of a hollow frame having a top and front, rear and end walls, said frame being provided with a downwardly facing semi-cylindrical bearing, a boat-shaped cap between the front and rear walls of the frame secured to the frame and having an outer wall registering with one of the end walls of the frame and having an upwardly facing semi-cylindrical bearing, a chuck barrel mounted in said combined bearing carrying a chuck external to the frame, a gear on the chuck barrel depending into said applied boat-shaped cap, a motor within the frame secured to it, and gearing driven by the motor terminating in a pinion meshing with said gear.

ROBERT B. PEALER.

REFERENCES CITED

The following references are of record in the file of this patent:

UNITED STATES PATENTS

| Number | Name | Date |
|---|---|---|
| 443,847 | Ewald | Dec. 30, 1890 |
| 1,576,708 | Bakken | Mar. 16, 1926 |
| 1,829,263 | Carlsen | Oct. 27, 1931 |
| 1,889,358 | Hammerly | Nov. 29, 1932 |
| 1,910,217 | Hadfield | May 23, 1933 |
| 2,055,908 | Pealer | Sept. 29, 1936 |
| 2,137,762 | Phillis | Nov. 22, 1938 |
| 2,191,191 | Pealer | Feb. 20, 1940 |
| 2,191,692 | Gould et al. | Feb. 27, 1940 |
| 2,224,691 | Pealer | Dec. 10, 1940 |
| 2,246,919 | Krantz | June 24, 1941 |
| 2,444,188 | England | June 29, 1948 |
| 2,466,355 | Baker | Apr. 5, 1949 |